United States Patent
Toyoda et al.

[11] Patent Number: 5,852,788
[45] Date of Patent: Dec. 22, 1998

[54] WHEEL SPEED CORRECTION METHOD THAT ACCOUNTS FOR USE OF A MINI TIRE

[75] Inventors: Keiji Toyoda; Noriyuki Takemasa, both of Hamakita, Japan

[73] Assignee: Nisshinbo Industries Inc., Tokyo, Japan

[21] Appl. No.: 638,924

[22] Filed: Apr. 25, 1996

[30] Foreign Application Priority Data

Oct. 4, 1995 [JP] Japan ..................... 7-282531

[51] Int. Cl.⁶ ............... B60K 28/16; G01P 3/56
[52] U.S. Cl. ............... 701/74; 701/75; 701/79; 701/93; 303/173; 303/187; 303/188
[58] Field of Search ............... 701/93, 71, 72, 701/74, 75, 79, 78; 303/173, 174, 186, 187, 188, 191

[56] References Cited

U.S. PATENT DOCUMENTS

| | | | |
|---|---|---|---|
| 4,545,623 | 10/1985 | Sato et al. | 303/191 |
| 4,566,737 | 1/1986 | Masaki et al. | 188/181 C |
| 5,015,042 | 5/1991 | Yoshino | 303/170 |
| 5,200,897 | 4/1993 | Makino et al. | 303/191 |
| 5,292,184 | 3/1994 | Takata | 701/72 |
| 5,299,131 | 3/1994 | Haas et al. | 73/510 |
| 5,436,836 | 7/1995 | Holtz et al. | 701/78 |

*Primary Examiner*—Tan Q. Nguyen
*Attorney, Agent, or Firm*—Nikaido, Marmelstein, Murray & Oram LLP

[57] ABSTRACT

A method is provided to correct the wheel speed for a vehicle equipped with a mini tire as the spare tire plus a nonvolatile memory device. The presence or absence of a mounted mini tire is detected while the vehicle is moving, and if a mini tire is mounted, the mounting information is stored in the nonvolatile memory. If an antilock control is triggered after the vehicle is restarted and in motion, a correction is made for the mini tire using the mounting information stored in the nonvolatile memory.

6 Claims, 4 Drawing Sheets

WHEEL SPEED CORRECTION METHOD THAT ACCOUNTS FOR USE OF A MINI TIRE

BACKGROUND OF THE INVENTION

This invention relates to the correction of the wheel speed of a vehicle, specifically for a vehicle equipped with a mini tire that is being used as the spare tire.

A conventional antilock brake device for vehicles equipped with a mini tire as the spare tire detects the mini tire and computes a correction coefficient each time the ignition is turned on. In this case, if the vehicle spins its tires immediately after the vehicle is started, the device will perform an antilock operation without an accurate correction for the diameter of the mini tire. This leads to the following problem: If a mini tire is mounted, and the driver were to brake suddenly immediately after the vehicle is set in motion, an antilock operation is triggered and performed without a correction for the mini tire. In this case, the probable vehicle speed is computed to be faster than the actual speed, resulting in an inaccurate antilock control, and possibly an insufficient attenuation of the wheel speed.

SUMMARY AND OBJECTIVE OF THE INVENTION

This invention enables a correction for a mini tire at all times whenever an antilock control action is triggered in a vehicle equipped with a mini spare tire.

A method is provided to correct the wheel speed for a vehicle equipped with a mini tire as the spare tire together with a nonvolatile memory device. The presence or absence of a mounted mini tire is detected while the car is moving, and if a mini tire is mounted, the mounting information is stored in the nonvolatile memory. If an antilock control is triggered after the car is restarted and in motion, a correction is made for the mini tire using the mounting information stored in the nonvolatile memory.

In the conventional system described above, if an antilock control operation is performed immediately after takeoff such that the diameter of the mini tire cannot be corrected, then the probable vehicle speed will be computed to be faster than its real speed, possibly extending the braking distance. However, in this invention, corrected data for the mini tire from the previous operation of the vehicle is stored in a nonvolatile memory. Therefore, for example, should accurate correction data for a mini tire not be obtainable immediately after startup, the previous correction data can be retrieved and used so that antilock control can be preformed accurately.

SIMPLIFIED EXPLANATION OF DIAGRAMS

The above and other objects and the attendant advantages of the present invention will become readily apparent by reference to the following detailed description when considered in conjunction with the accompanying drawings wherein.

DETAILED DESCRIPTION AND PREFERRED EMBODIMENT OF THE INVENTION

A preferred embodiment of this invention will now be explained using the diagrams.

1. Brake Control Device

Figure 1:
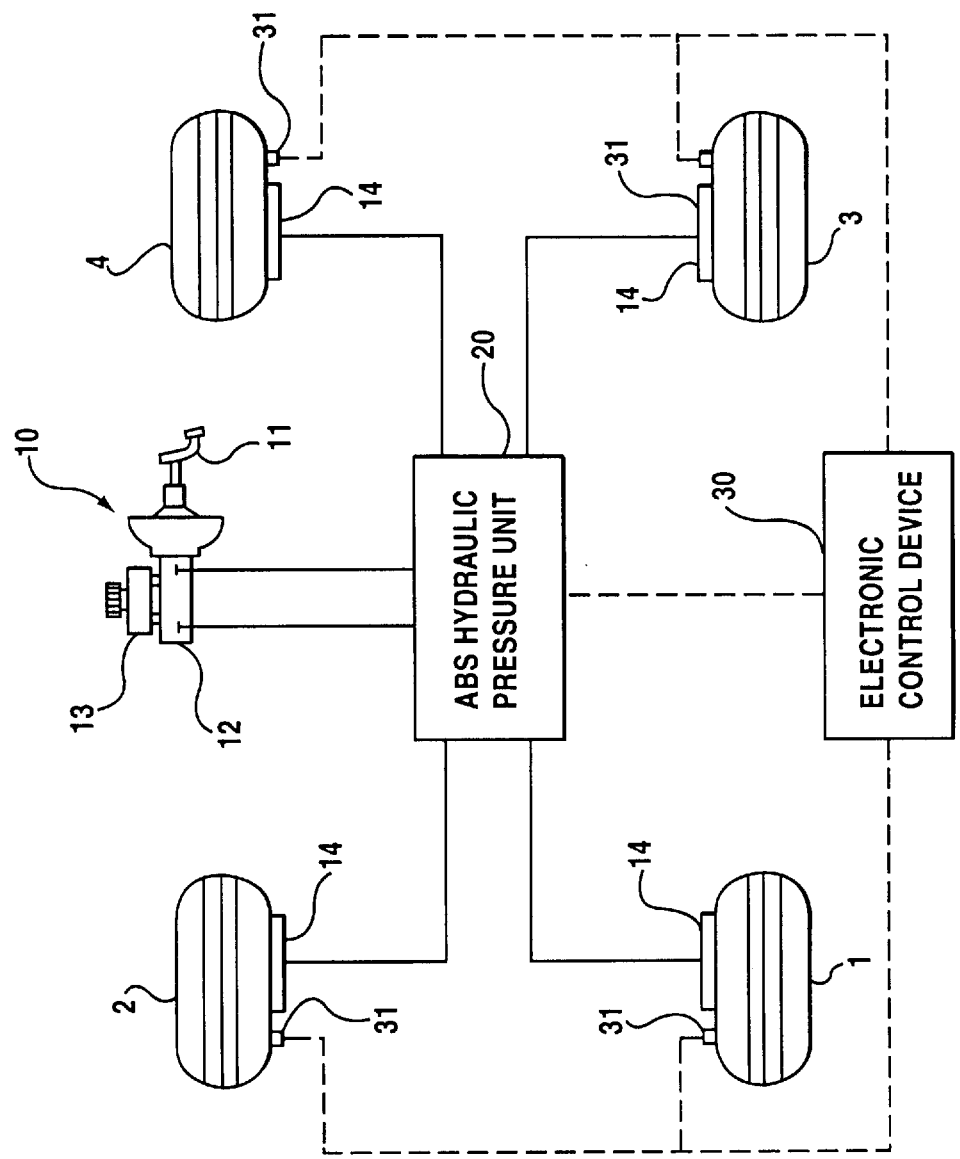
FIG. 1 is a conceptual diagram of an antilock brake control device.
Figure 2:
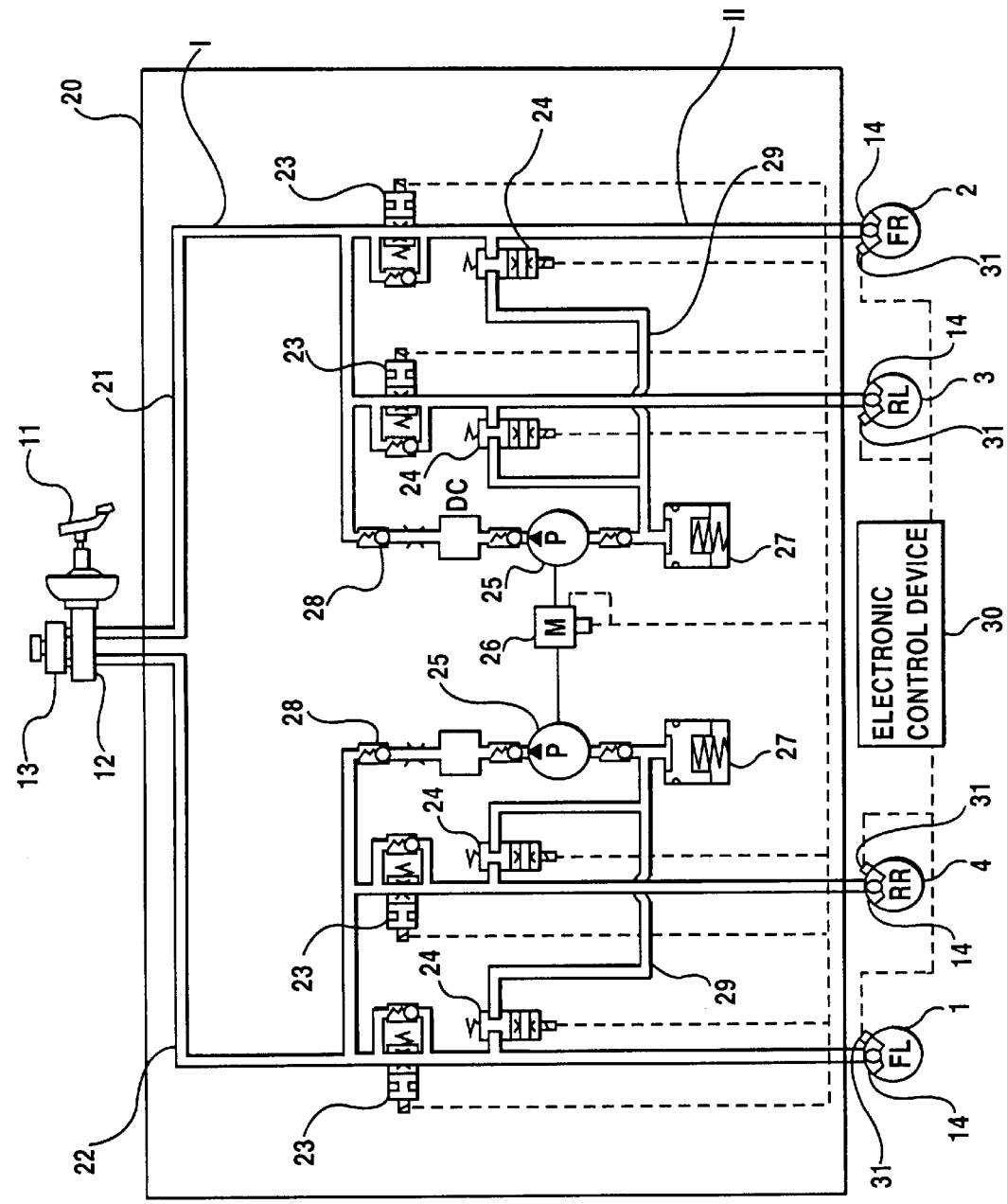
FIG. 2 illustrates the brake circuits of an antilock brake control device.

An example of the brake control device is shown in FIG. 1 and FIG. 2. During normal braking, when the driver presses the brake pedal 11, brake fluid is supplied from the main reservoir 13 to generate a brake pressure at the master cylinder 12. The brake pressure so generated is applied to the inlet valves 23 installed in the main brake lines and to the respective wheel cylinder 14 of each wheel 1–4 to brake the vehicle.

Should, for example, the brake pedal be pressed hard causing the wheels to slip, an antilock control action will be triggered. The electronic control device 30, with signals received from the wheel speed sensor 31, controls the operation of the ABS hydraulic pressure unit 20 in order to prevent the locking of each wheel 1–4.

The electronic control device 30 can be a customized hardware device, or can be configured from an input device, processor, memory device, output device, and other general computer components. Main memory plus memory to record and store data, fixed storage, or a variety of memory types can be used for the memory device. For example, an EEPROM or other type of erasable, nonvolatile memory, or a battery backup RAM can be used as the memory to record and store fault codes and other data.

2. Configuration of Brake Circuits

FIG. 2 illustrates a diagonal configuration which has two independent circuits, a first brake circuit 21 and a second brake circuit 22, through the master cylinder 12.

The main reservoir 13 stores the brake fluid supplied to the master cylinder 12. The first brake circuit 21 is connected to the wheel cylinders 14, 14 of the right front wheel 2 and left rear wheel 3 via the inlet valve 23, 23; and the outlet valves 24, 24 to the auxiliary reservoirs 27. Similarly, the second brake circuit 22 is connected to the wheel cylinders 14, 14 of the right rear wheel 4 and left front wheel 1 via the inlet valves 23, 23 and via the outlet valves 24, 24 to the auxiliary reservoirs 27. In addition, in FIG. 2, the numeral reference 28 represents a check valve.

3. Relative Speed of Each Wheel While Car is Turning

Figure 3:
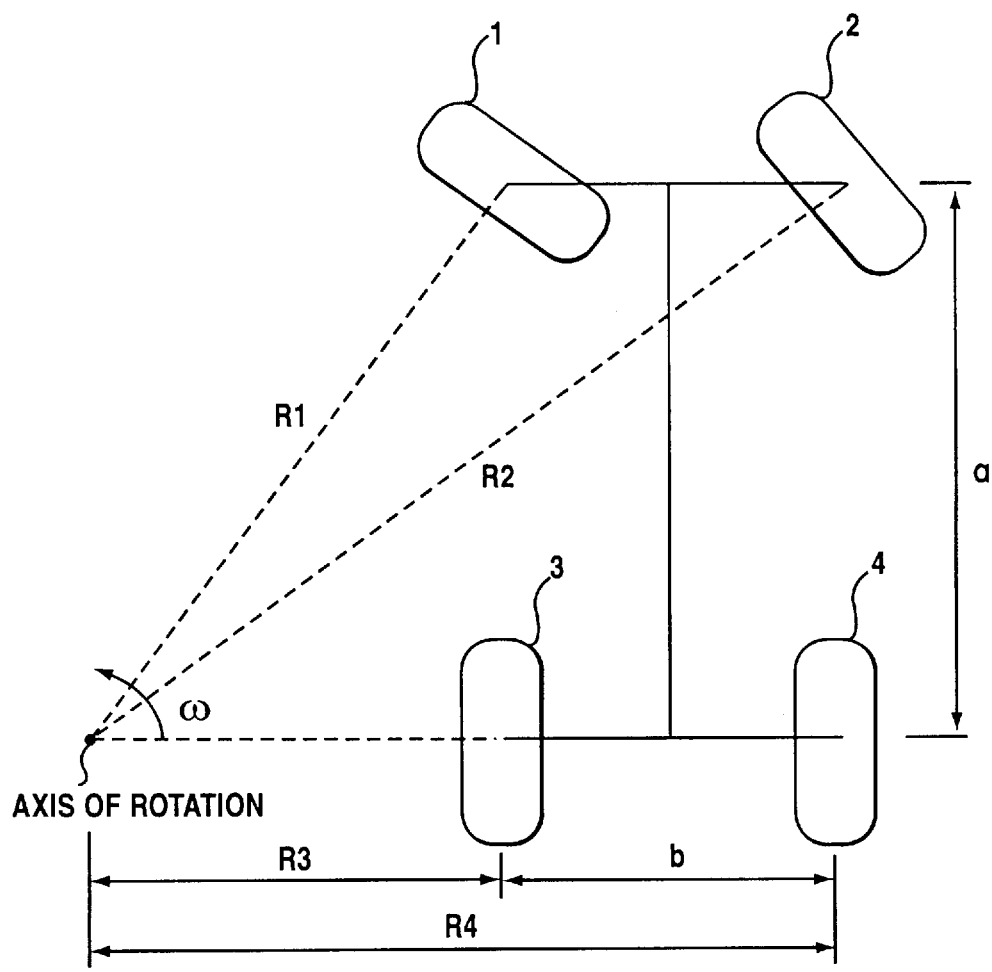
FIG. 3 illustrates the state of the wheels in making a left turn.

The speed of each wheel is different when the car is making a turn. As shown in FIG. 3 for a left turn, each wheel has a respective radius of R1, R2, R3, R4 around the axis of rotation, the relationship of which can be expressed by Equations 1–4, which use the wheels base (a) and tread (b). In these equations, $\omega$ is the angular velocity about the axis of rotation of the circular path drawn by the vehicle. Similar relational formulas can be obtained for a right turn by a simple left and right reversal.

$$V1 = \omega R1 = (R3^2 + a^2)^{\frac{1}{2}} \times \frac{V3}{R3} \qquad (1)$$

where V1=Speed of left front wheel;

V3=Speed of left rear wheel;

R1=Turning radius of left front wheel;

R3=Turning radius of left rear wheel;

$\omega$=Angular velocity of rotation of the vehicle; and a=Wheel base.

$$V2 = \omega R2 = ((R3+b)^2 + a^2)^{\frac{1}{2}} \times \frac{V3}{R3} \qquad (2)$$

where V2=Speed of right front wheel;
R2=Turning radius of right front wheel; and
b=Tread.

$$V3 = \omega R3 \qquad (3)$$

$$V4 = \omega R4 = (R3+b) \times \frac{V3}{R3} \qquad (4)$$

where V4=Speed of right rear wheel;
R4=Turning radius of right rear wheel;

4. Mounted Mini Tire

In newer model cars, the spare tire is likely to be a mini tire of a smaller diameter than a normal tire. As such, when it is mounted in place of a defective normal tire, the output of the wheel speed sensor is a larger value than would be for a normal tire. Hence, when a mini tire is mounted, the brake control device must make a correction for the radius of the tire.

The following sections will explain control actions during various braking operations.

(1) Normal Braking

For normal braking, when the driver presses the brake pedal 11, brake fluid is supplied from the main reservoir 13 to generate at the master cylinder 12. The brake pressure so generated is applied to the inlet valves 23 installed in the main brake lines and to the respective wheel cylinder 14 of each wheel 1–4 to brake the vehicle.

(2) Antilock Brake Control

Should a wheel slip during braking, locking of the wheels is controlled as follows. The brake pressure is exhausted from the wheel cylinder 14 by the operation of the outlet valve 24, pump 25 in the reflux line 29, and inlet valve 23, to the auxiliary reservoir 27 via the main brake line II and outlet valve 24. The pressure is returned to the main brake line I via the pump 25 (motor 26) and the dumping chamber DC, then supplied to the wheel cylinder 14 via the inlet valve 23 and the main brake line II.

Next, the correction for a mini tire is explained.

5. Detection of Mounted Mini Tire

Detection of a mini tire starts when the vehicle starts to move. Different methods are available for this detection. For example, if the vehicle is traveling normally in a straight line, and if all four tires mounted on the wheels are of the same diameter, that is normal tires, then all four wheels will have the same speed.

In contrast, if a mini tire is mounted, the speed of the mini tire wheel is faster by a specified ratio. Hence the speeds of all wheels are compared to determine on which wheel the mini tire is mounted, and a corrected value for the speed of the mini tire relative to the speeds of wheels mounted with normal tires can be derived.

If the vehicle is making a normal turn without spinning any wheel, and if all four wheels are mounted with normal tires of the same diameter, then the wheel speeds satisfy Equations (1) to (4). These equations can be modified in the form of Equation (5) or approximated by Equation (6). If a mini tire is mounted on a wheel, then Equation (5) or (6) is no longer satisfied.

$$V1^2+V4^2=V2^2+V3^2 \qquad (5)$$

$$V1+V4=V2+V3 \qquad (6)$$

Detection of a mini tire is performed repeatedly while the car is in motion. If a mini tire is mounted, its position, corrected diameter, and other data are derived. Accurate correction data for a mini tire can be derived after the car travels for a short period. This data can be stored in memory as mounting information, including the presence or absence of a mini tire, its mounted position, and corrected values.

Any nonvolatile memory which will preserve the contents in memory, even when the power source of the car is turned off, can be used.

6. Detection of Mini Tire After Re-startup of Vehicle

If the mini tire is mounted and the car is driven for a period, stopped and the ignition turned off, then upon restart, accurate correction data for the mini tire can be derived after the car is driven for a prescribed distance. But if an antiskid control action were to be triggered immediately after the car is restarted, conventionally, accurate correction data would not always be obtained.

In this invention, Equation 5, or a modified version thereof, or its approximation Equation (6) is used to judge whether a mini tire is mounted. If the equation is not satisfied, the correction data stored in the nonvolatile memory is retrieved, and used to make the corrections for the mini tire. This enables an accurate, antiskid control action to be performed.

Also, if a wheel is spinning, then the speed of each wheel will not satisfy Equation (5) either. In this case, it is difficult to derive accurate correction data, and again the correction data stored in the nonvolatile memory is used.

If the position of the mounted mini tire is known, but the correction data cannot be derived, then the correction data corresponding to the standard diameter of a mini tire used as a spare tire is utilized. For example, a correction diameter of (k/K) is used, where k is the diameter of the mini tire and K is the diameter of a normal tire.

Figure 4:
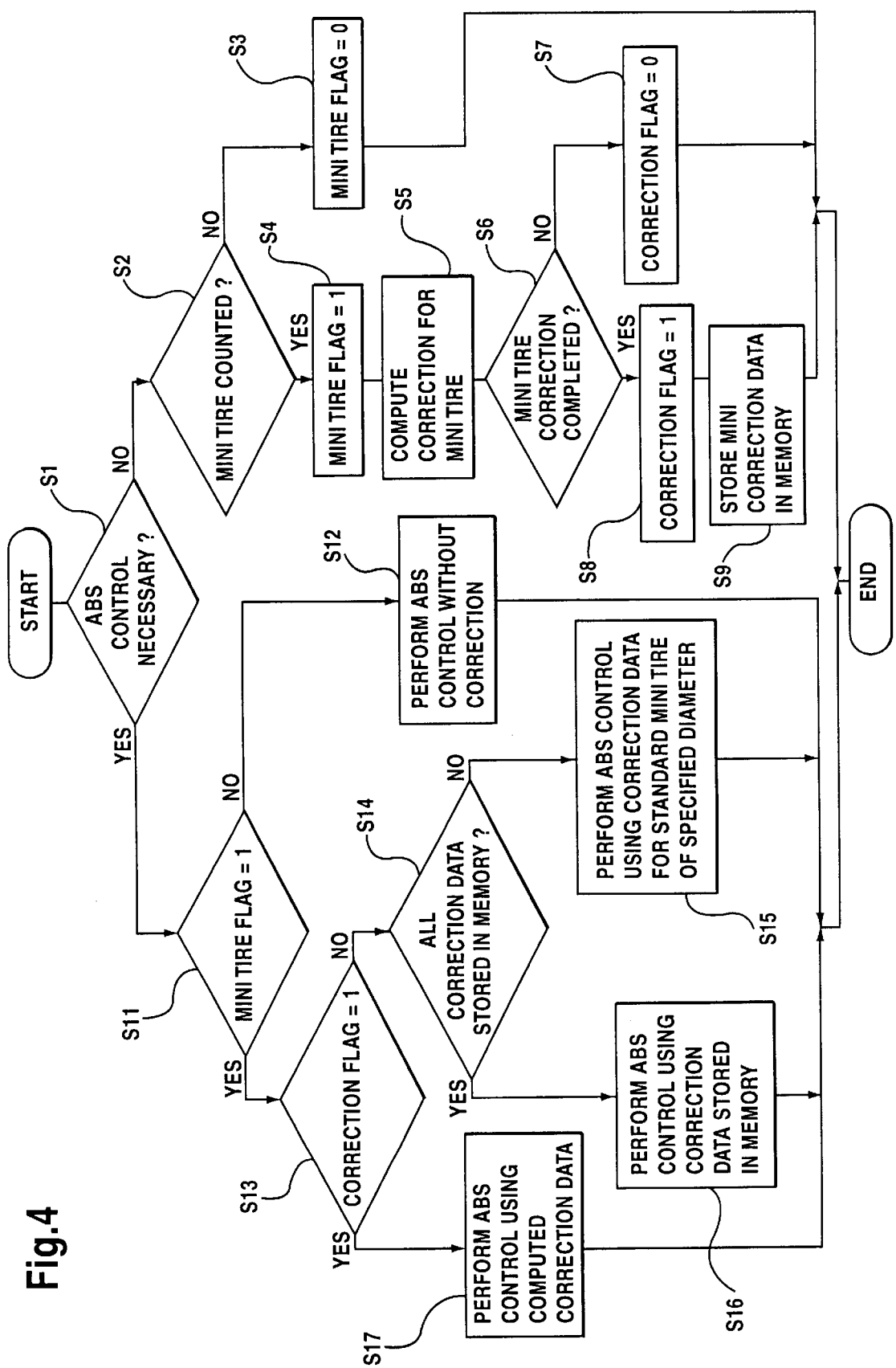
FIG. 4 is a flow diagram for the correction of a mounted mini tire.

Next, an example of the flow of procedures in the correction of a mini tire is explained, using FIG. 4.

7. No ABS Action, and No Mini Tire is Mounted

Once the car is in motion, first, a decision (S1) is made as to the necessity of performing an antilock control action. If not necessary, a check is made as to whether the measured wheel speed satisfies Equation (5) or (6), and a decision (S2) is made as to the presence or absence of a mini tire. If a mini tire is not mounted, the mini tire flag is set to 0 (S3).

8. No ABS action, and a Mini Tire is Mounted

If a mini tire is mounted, the mini tire flag is set to 1 (S4), and a corrected value for the mini tire is computed (S5). Next, a decision is made as to whether correction of the mini tire is completed (S6); if not complete, the correction flag is set to 0 (S7).

After a prescribed time period has elapsed and correction is completed, the correction flag is set to 1 (S8), and the mini tire correction data is stored in the nonvolatile memory (S9).

9. ABS Control is Performed, and Mini Tire is Not Mounted

A decision is made as to the necessity of an antilock control action (S1), and if necessary, the presence or absence of a mini tire is determined by the mini tire flag (S11). If the flag is set at 0, an antilock control is performed without a correction for the mini tire (S12).

10. ABS Control is Performed, and Mini Tire is Mounted

If the mini tire flag is set at 1, the correction flag is checked to determine if the mini tire correction is completed (S13). If not completed, a check is made as to whether correction data is stored (S14). If not stored, an antilock control is performed using correction data corresponding to the diameter of a standard mini tire (S15). If data is stored, the data is retrieved from the nonvolatile memory, and an antilock control is performed (S16).

If the mini tire flag is set at 1 and correction is completed (S13), then an antilock control is performed using the computed mini tire correction data computed after the vehicle was started and before the antilock control action was triggered (S17).

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A method to correct ABS control for wheel speed for a vehicle equipped with a mini tire to be used as a spare tire and having a nonvolatile memory device comprising:

determining the presence or absence of a mounted mini tire on a vehicle while the vehicle is in motion and producing mounting information if a mini tire is mounted;

storing the mounting information in a nonvolatile memory, if a mini tire is mounted;

correcting an ABS control for the mini tire using the mounting information stored in the nonvolatile memory, if an antilock control is triggered after the vehicle is restarted and in motion: and comparing an observed wheel speed to a formula relating wheel base and tread of the vehicle to wheel speed, if the formula is not satisfied, then inferring that a mini tire is mounted, wherein the formula is:

$$V1^2+V4^2=V2^2+V3^2$$

where V1=Speed of left front wheel;
   V2=Speed of right front wheel;
   V3=Speed of left rear wheel; and
   V4=Speed of right rear wheel.

2. A method to correct ABS control for wheel speed for a vehicle equipped with a mini tire to be used as a spare tire and having a nonvolatile memory device, comprising:

determining the presence or absence of a mounted mini tire on a vehicle while the vehicle is in motion;

deriving correction data for the mini tire, if a mini tire is mounted:

storing the correction data in a nonvolatile memory;

correcting an ABS control for the mini tire using the correction data stored in the nonvolatile memory, if an antilock control is triggered after the vehicle is restarted and in motion; and comparing an observed wheel speed to a formula relating wheel base and tread of the vehicle to wheel speed, if the formula is not satisfied, then inferring that a mini tire is mounted, wherein the formula is:

$$V1^2+V4^2=V2^2+V3^2$$

where V1=Speed of left front wheel;
   V2=Speed of right front wheel;
   V3=Speed of left rear wheel; and
   V4=Speed of right rear wheel.

3. A method to correct ABS control for wheel speed for a vehicle equipped with a mini tire to be used as a spare tire and having a nonvolatile memory device, comprising:

detecting the presence or absence of a mounted mini tire on a vehicle while the vehicle is moving;

deriving correction data for the mini tire, if a mini tire is mounted;

storing the correction data in a nonvolatile memory;

re-determining correction data for the mini tire after the vehicle is restarted and in motion;

correcting an ABS control for the mini tire using the derived correction data stored in the memory, if an antilock control is triggered before the re-determining of the correction data is completed; and comparing an observed wheel speed to a formula relating wheel base and tread of the vehicle to wheel speed, if the formula is not satisfied, then inferring that a mini tire is mounted, wherein the formula is:

$$V1^2+V4^2=V2^2+V3^2$$

where V1=Speed of left front wheel;
   V2=Speed of right front wheel;
   V3=Speed of left rear wheel; and
   V4=Speed of right rear wheel.

4. A method to correct ABS control for wheel speed for a vehicle equipped with a mini tire to be used as a spare tire and having a nonvolatile memory device, comprising:

determining the presence or absence of a mounted mini tire on a vehicle while the vehicle is in motion and producing mounting information if a mini tire is mounted;

storing the mounting information in a nonvolatile memory, if a mini tire is mounted;

correcting an ABS control for the mini tire using the mounting information stored in the nonvolatile memory, if an antilock control is triggered after the vehicle is restarted and in motion; and comparing an observed wheel speed to a formula relating wheel base and tread of the vehicle to wheel speed, if the formula is not satisfied, then inferring that a mini tire is mounted, wherein the formula is:

$$V1+V4=V2+V3$$

where V1=Speed of left front wheel;
   V2=Speed of right front wheel;
   V3=Speed of left rear wheel; and
   V4=Speed of right rear wheel.

5. A method to correct ABS control for wheel speed for a vehicle equipped with a mini tire to be used as a spare tire and having a nonvolatile memory device, comprising:

determining the presence or absence of a mounted mini tire on a vehicle while the vehicle is in motion;

deriving correction data for the mini tire, if a mini tire is mounted;

storing the correction data in a nonvolatile memory;

correcting an ABS control for the mini tire using the correction data stored in the nonvolatile memory, if an antilock control is triggered after the vehicle is restarted and in motion; and comparing an observed wheel speed to a formula relating wheel base and tread of the vehicle to wheel speed, if the formula is not satisfied, then inferring that a mini tire is mounted, wherein the formula is:

$$V1+V4=V2+V3$$

where V1=Speed of left front wheel;
V2=Speed of right front wheel;
V3=Speed of left rear wheel; and
V4=Speed of right rear wheel.

6. A method to correct ABS control for wheel speed for a vehicle equipped with a mini tire to be used as a spare tire and having a nonvolatile memory device, comprising:

detecting the presence or absence of a mounted mini tire on a vehicle while the vehicle is moving;

deriving correction data for the mini tire, if a mini tire is mounted;

storing the correction data in a nonvolatile memory;

re-determining correction data for the mini tire after the vehicle is restarted and in motion;

correcting an ABS control for the mini tire using the derived correction data stored in the memory, if an antilock control is triggered before the re-determining of the correction data is completed; and comparing an observed wheel speed to a formula relating wheel base and tread of the vehicle to wheel speed, if the formula is not satisfied, then inferring that a mini tire is mounted, wherein the formula is:

$$V1+V4=V2+V3$$

where V1=Speed of left front wheel;
V2=Speed of right front wheel;
V3=Speed of left rear wheel; and
V4=Speed of right rear wheel.

* * * * *